(12) United States Patent
Rizzo

(10) Patent No.: US 9,794,189 B2
(45) Date of Patent: Oct. 17, 2017

(54) BANDWIDTH MANAGEMENT FOR CONTENT DELIVERY

(75) Inventor: Michael Rizzo, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 401 days.

(21) Appl. No.: 14/346,798

(22) PCT Filed: Sep. 14, 2012

(86) PCT No.: PCT/GB2012/000718
§ 371 (c)(1),
(2), (4) Date: Mar. 24, 2014

(87) PCT Pub. No.: WO2013/045870
PCT Pub. Date: Apr. 4, 2013

(65) Prior Publication Data
US 2014/0244849 A1  Aug. 28, 2014

(30) Foreign Application Priority Data
Sep. 30, 2011  (EP) .................... 11250834

(51) Int. Cl.
G06F 15/173  (2006.01)
H04L 12/917  (2013.01)
(Continued)

(52) U.S. Cl.
CPC .......... H04L 47/76 (2013.01); H04L 47/2416 (2013.01); H04L 65/4084 (2013.01); H04L 65/602 (2013.01); H04L 65/80 (2013.01)

(58) Field of Classification Search
CPC . H04L 47/76; H04L 47/2416; H04L 65/4084; H04L 65/602; H04L 65/80
See application file for complete search history.

(56) References Cited

U.S. PATENT DOCUMENTS

2002/0141379 A1* 10/2002 Davari .................. H04L 49/255
370/351
2006/0164978 A1* 7/2006 Werner ............... H04L 41/0896
370/229
(Continued)

FOREIGN PATENT DOCUMENTS

WO  WO 01/99342    12/2001
WO  WO 2005/122500 12/2005
(Continued)

OTHER PUBLICATIONS

International Search Report for PCT/GB2012/000718, dated Nov. 30, 2012.
(Continued)

Primary Examiner — June Sison
Assistant Examiner — Steven Nguyen
(74) Attorney, Agent, or Firm — Nixon & Vanderhye PC

(57) ABSTRACT

A service platform for a content delivery network indicates a transmission rate cap to be imposed when streaming data to a data requesting device over an access network. Means are provided for receiving a service request for delivery of data from a requesting device as the result of which the requested data is delivered as a prioritised traffic stream over an access link to the requesting device. The service platform processes the service request to determine one or more performance characteristics of said access link and uses this to determine the maximum transmission rate for the requested data to be streamed at over the access link during its delivery to the requesting device. This information is included in a source address for the requested data which the service platform generates, typically as a URL. The maximum transmission rate set is provided as a prefix to the URL (or in some other meta-data format) to the requesting device, and the content delivery platform is configured to ensure that requests for media assets which are received at the logical or (Continued)

virtual ports associated with the URL pre-fixes are responded to by transmissions limited to the maximum bandwidth cap indicated by the URL pre-fix.

12 Claims, 10 Drawing Sheets

(51) Int. Cl.
    *H04L 12/853*     (2013.01)
    *H04L 29/06*     (2006.01)

(56) References Cited

U.S. PATENT DOCUMENTS

| | | | |
|---|---|---|---|
| 2010/0023634 A1* | 1/2010 | Labonte | H04L 47/10 709/231 |
| 2011/0179186 A1* | 7/2011 | Li | H04L 65/4084 709/231 |
| 2012/0120818 A1* | 5/2012 | Lientz | H04L 41/0896 370/252 |
| 2013/0007831 A1* | 1/2013 | Wu | H04N 21/23655 725/116 |
| 2013/0162841 A1* | 6/2013 | Gustafsson | G06T 7/0002 348/192 |
| 2013/0286879 A1* | 10/2013 | ElArabawy | H04N 21/26208 370/252 |

FOREIGN PATENT DOCUMENTS

| | | |
|---|---|---|
| WO | WO 2009/029202 | 3/2009 |
| WO | WO 2011/076737 | 6/2011 |
| WO | WO 2011/109101 | 9/2011 |

OTHER PUBLICATIONS

Office Action dated Feb. 6, 2017 issued in corresponding European Application No. 12 762 022.7 (4 pgs.).

* cited by examiner

BANDWIDTH MANAGEMENT FOR CONTENT DELIVERY

This application is the U.S. national phase of International Application No. PCT/GB2012/000718 filed 14 Sep. 2012 which designated the U.S. and claims priority to EP Patent Application No. 11250834.6 filed 30 Sep. 2011, the entire contents of each of which are hereby incorporated by reference.

BACKGROUND AND SUMMARY

The present invention relates to a method of managing bandwidth for content delivery and related aspects. In particular, but not exclusively, to a method for dynamically determining and/or adjusting a static transmission rate cap imposed on an access link in a communications network to enable a consistent quality of service to be experienced at customer premises equipment when streaming prioritised traffic over access links having differing performance characteristics.

Content delivery systems are well known in the art and provide a range of multi-media formatted data for playback on a device either as streamed content or as files for download and subsequent playback. The content may be broadcast, multi-cast or provided in response to a request for content generated by a playback application running on a device. Live data streams of video and audio information are particularly subject to quality of service issues given the varying bandwidth capacities and error characteristics of the access links to customer premises equipment. Whilst typical examples of content delivered in this way focus on encoded audio and video data, references herein to content or content data may include data enabling fabrication of three-dimensional objects via suitable customer premises equipment, such as 3D fabricators and printers already known in the art.

Currently, content is delivered over a range of network architectures including wireless and fixed or wired infrastructures, such as the public switched telephone network (PSTN). Content providers are currently used to providing content at various levels of encoding to enable content to be delivered in a timely manner to content using devices according to the anticipated transmission conditions and receiver buffer capabilities on the relevant device to which content is being delivered.

In addition to the known differences between wireless networks such as cellular communications networks and wireless local area networks (WLANs) and fixed line (copper and/or optical) connections over the access network to the public switched telephone network (PSTN), there is considerable variation in the capacity and error characteristics of individual lines in the access network itself. Devices which use a Digital Subscriber Line (DSL) broadband service over a copper line and/or optical fibre access network connection receive a great variation in service due to the amount of bandwidth capacity each access line can support, as well as the proportion of traffic that is dropped as a consequence of line errors. This is dependent in part on physical characteristics of each access line connecting the local exchange to the customer premises equipment, for example, the distance to the exchange is a key factor impacting the level of errors in data transmitted on an access line.

Furthermore, some access networks provide prioritisation mechanisms to enable time-sensitive traffic, such as video streaming traffic, to be protected in the event of there being congestion in the network. However, precautions need to be taken to ensure that such traffic does not unnecessarily consume more priority bandwidth than is actually required, as this will unnecessarily disrupt non-priority traffic. One common method for implementing such a precaution is to place a rate cap on the transmission rate used to stream the content. Known systems set a default level of bandwidth as the upper transmission rate limit rather than take into account the actual condition of each access line. For example, a network-wide line rate cap of 95% may be imposed for prioritised traffic streams. In such a network, if a customer's access line supports a maximum bandwidth capacity of 1.4 Mbps, then 95% cap would result in just 1.37 Mbps being available for prioritised traffic. A content distributor of media assets which are encoded, at 1.4 Mbps would therefore not be able to provide a prioritised delivery of such content to that particular customer due to their access line not supporting a high enough maximum bandwidth.

Another issue to consider, however, is a scenario where two customer's different access lines each support a maximum bandwidth capacity of 2 Mbps, however, one access line has historically a higher level of transmission errors. In this case, if the maximum transmission rate used to deliver a prioritised traffic stream on both customer's access lines is set at 1.9 Mbps, this might be sufficient for one to receive a good quality service but the other may not experience such a good quality service as the higher line error rate would result in more errors and a higher need to retransmit lost data. This would mean that the quality of experience provided when streaming the same requested asset to customers would be different on a network-wide basis even though the asset each customer receives has been encoded at the same level and transmitted at the same transmission rate.

Accordingly, in order to maintain a consistent Quality of Experience for prioritised content delivery services to client terminals, some access lines to customer premises over the access network require content to be delivered using more bandwidth than is normally required in order to compensate for higher transmission error rates and consequent re-transmissions.

International Patent Application Number WO 05122500 describes an admission control system which ensures that a minimum percentage of bandwidth is always available for best effort, and which may therefore lead to rejection of new priority session requests to protect existing best effort traffic. However, this does not consider how to manage priority traffic so that it does not affect best effort traffic any more than is absolutely necessary to achieve the desired VoD quality experience.

WO0199342 describes an approach to ATM cell queuing/scheduling wherein various bandwidth parameters are expressed in terms of percentages of available bandwidth as opposed to absolute values—which essentially means that if total available bandwidth drops, then priority queues "lose" bandwidth proportionately, so that lower priorities are not starved.

WO11076737 describes a method for recommending content encoding rates that are appropriate for prevailing network conditions i.e. using lower quality encoding at times when, the network is busy.

WO2011/109101 and WO2009/029202 describe systems in which transmission rates on access links are scaled in response to limitations on the available bandwidth on those links. However, these references do not consider how to deliver a target quality of experience on a given access line in a consistent manner across an access network. Nor is any consideration given as to how to ensure that best effort traffic is not starved of bandwidth any more than it needs to be in a consistent manner across the access network.

The invention seeks to provide a delivery system for media assets encoded at a predetermined constant encoding rate (CBR-encoded content) and which streams requested data to receiving devices as prioritised traffic up to a rate cap that is tailor-made for the access line on which the requested data is being streamed.

FIG. 1 of the accompanying drawings shows a communications system 10 in which a typical content delivery service is provided to customer premises equipment 18a,b,c. As shown in FIG. 1, each CPE 18a,b,c, is connected by a respective access line 20a,b,c to a digital subscriber line access manager (DSLAM) 22 (for example, housed at a local exchange or other distribution point). Authorisation for using a broadband service is provided by a broadband remote access server (BRAS) 24. A suitable application 30 running on each device 18 (see FIG. 2 of the accompanying drawings) is configured to access a service platform 16 with service requests for receiving content. Service platform 16 responds to the content requesting CPE 18a,b,c, with a suitable content address, normally an address provided as a URL to a request router (not shown) for the delivery platform 12 which forwards the request to a server local to the CPE 18 from which the request originates (this enables the communications system to operate in a more bandwidth efficient manner).

The CPE 18 then generates a suitable request, for example, a hypertext transfer protocol (http) request address to the URL provided by the service platform 16. When the delivery platform 12 receives the request, the URL itself may provide information such as the format of encoding to be applied to the content, and this is then used to retrieve an appropriate data item (also referred to herein as a media asset) from data store 14. The delivery platform 12 then streams the requested data over the respective access line 20a,b,c to the respective requesting CPE 18a,b,c.

If requested data is delivered as a prioritised traffic stream over the access network it enables data to be streamed more reliably to a content using device due to this type of traffic taking priority over other non-prioritised (also known as best-efforts traffic) for any available bandwidth, particularly at times of congestion. FIG. 2 shows an exemplary scenario in which instead of the CPE 18 comprising just one customer premises device configured to use an access line 20, a plurality of devices 28a,b are shown which share an individual access line 20 (for example, access line 20b shown in FIG. 1) using a suitable access point/modem 26. Each device 28a,b as shown is capable of supporting one or more applications 30a, b which generate and/or receive traffic over the access line 20. If more than one device 28, or equally, if more than one application on an individual device 28, require use of the access line 20b at the same time, however, if any bandwidth consumed by a prioritised service to the customer premises is too high, it negatively impacts the performance of any other applications generating non-priority traffic. So, for example, if device 28a is running a web-browser application 30a at the same time as a media player application 30b has requested a live television programme, if the access line they are connected to does not have sufficient available bandwidth, the web-browser may stall as it could be starved of bandwidth for its best-efforts traffic.

Such an exemplary scenario is shown in FIG. 3A for an access line offering an assured rate traffic service set at 1.6 Mbps. If the access line has a 2 Mbps maximum bandwidth capacity, then 0.4 Mbps is available for best efforts traffic, which is not a problem. If, however, an access line is only able to support at most 1.65 Mbps say then only 0.05 Mbps is available to best efforts traffic during time $t_{start}$ to $t_{end}$ when a traffic stream is being transmitted using the assured rate of 1.6 Mbps. However, if the maximum bandwidth is even lower for that particular access line, the provision of an assured rates may result in no bandwidth at all being effectively available for best efforts traffic during an assured rate transmission (which should result in the requested delivery service being denied).

FIG. 3B shows an alternative bandwidth management scheme for access networks in which prioritised traffic is streamed at up to 95% of the maximum available bandwidth in bursts. This means that there is always at least 5% of bandwidth available for best efforts traffic. For an access line capable of supporting transmission at bandwidths of up to 2 Mbps, this means there will be at least 0.1 Mbps available for best effort traffic, and much more is available if the transmission of prioritised traffic is bursty as there will be intervals between prioritised traffic bursts when the full bandwidth of the line is potentially available for best efforts traffic. However, there are still problems with using a prioritised traffic bandwidth management scheme for managing bandwidth when delivering content to CPEs due to the variation in the maximum line rates each access line can support, as FIGS. 4A and 4B show.

FIG. 4B shows how bandwidth is managed conventionally for an access line with a maximum bandwidth capacity or line rate of 1.6 Mbps, meaning that if a generic line rate cap across the access network of 95% of the maximum available bandwidth is imposed only 0.08 Mbps might be made available for best efforts traffic. FIG. 4A shows the converse situation, where an access line has a high line rate and supports transmission rates up to 30 Mbps. In this case, 28.5 Mbps would be reserved automatically for prioritised traffic using a 95% generic access network cap, leaving 1.5 Mbps for best efforts traffic. Unless content has been encoded for delivery at 28.5 Mbps however, the reservation at this percentile rate of available line capacity results in the bandwidth reserved unnecessarily as more could be made available to best efforts traffic without impacting the delivery of the prioritised traffic stream.

In addition to the limitations mentioned above, several problems are known in the art to be associated with such types of CDN including potential abuse of the priority channel by some media playback clients which consume as much capacity on the access line as possible until their media buffer is full. When this occurs, best effort traffic suffers unnecessarily as more bandwidth is consumed for media playback than is actually required to meet the desired quality of experience.

As mentioned above, it is known in the art for CDN servers to provide support for transmission rate capping. A static unvarying transmission rate cap is imposed on all prioritised traffic streams by the content delivery server. This prevents undue abuse by media playback clients which might otherwise cause too much bandwidth to be consumed by prioritised traffic streams by limiting the maximum transmission rate that can be used by the delivery service when transmitting a media stream to the client. Each media asset is delivered using a predetermined CBR with a transmission rate cap which is typically set slightly above the media encoding rate, for example, at 120% of the encoding rate. This allows the media buffer at the CPE to fill with data and creates a safety margin of content in the buffer so that additional content can be released from the buffer for playback to compensate for transmission errors and subsequent re-transmissions.

The present invention relates primarily to content delivery networks which provide video-on-demand (VoD) services delivered over the access network as a Constant Bit Rate (CBR) media asset to an end-user device on an access line, although this is not the only application of the invention. The CDN supports prioritised delivery of such a media asset to the end-user device to provide delivery assurances regarding the QoE (Quality of Experience) of any playback of the media asset file and is configured so that when there is congestion best effort traffic is dropped to secure bandwidth for services requiring the prioritised traffic. As an example, a typical Quality of Experience metric comprises how many times a video freezes in a given time interval when being viewed during its streamed delivery. Other examples of Quality of Experience measurement parameters are described later herein below.

The invention seeks to obviate and/or mitigate a limitation of known CDNs which affects the delivery of CBR media assets if the communications access network comprises access lines which have different error characteristics. A typical error characteristic may comprise a bit error rate or a packet transmission error. CBR content delivery over some access lines requires slightly higher rate caps than is required on other lines to deliver equivalent quality of experience to CPE for the same CBR media asset. While it is possible to simply use higher rate caps e.g. 98% for all lines, this would be unnecessarily wasteful (i.e. detrimental to best effort traffic) on lines that could work well with lower rate caps.

Aspects of the invention as described herein below and by the accompanying independent claims may be combined with each other and any of the preferred embodiments described herein below and in the accompanying dependent claims, in any suitable manner apparent to one of ordinary skill in the art.

A first aspect of the invention seeks to provide a method for adjusting a transmission rate cap imposed by a service platform on an access link in a communications network comprising a plurality of access links, the method comprising:
 receiving a service request for delivery of data from a requesting device, wherein subsequent delivery of said requested data generates prioritised traffic over an access link to the requesting device using a capped transmission rate;
 processing the service request to determine one or more performance characteristics of said access link;
 determining from said performance characteristics of said access link whether an adjusted transmission rate cap is to be imposed on the access link during delivery of said prioritised traffic to the requesting device, and if so,
 generating a source address for said data comprising meta-data indicating said adjusted transmission rate cap to be imposed during delivery of said prioritised traffic over said access link to said requesting device, and reporting the source address to the requesting device;
 wherein the adjusted transmission rate cap imposed on each access link in said communications network enables a measurable quality-of-experience parameter for delivery of said requested data to be data to be of equivalent transmission quality on each said access link.

The measurable quality-of-experience parameter may enable a measurable contribution to a perceived mean opinion score quality parameter for, delivery of said requested data.

A said perceived mean opinion score quality parameter may comprise a number of degradation in service degradations in a given time interval.

The source address generated may comprise a URL from which requested data can be retrieved by the requesting device.

The meta-data may comprise a pre-fix to the URL for the requested data which indicates a maximum transmission rate to be used when streaming the requested data to the requesting device over said access link.

Another aspect of the invention seeks to provide a service platform for a content delivery network, the service platform being arranged to indicate respective transmission rate caps to be imposed when streaming data to each of a plurality of data requesting devices over respective access lines to which the devices are connected, the service platform being arranged to receive service requests for delivery of data from the requesting devices,
 a media selector for processing each service request to determine one or more performance characteristics of said access links, to determine from said performance characteristics of said access links whether an adjusted transmission rate cap is to be imposed on each access link during delivery of prioritised traffic to the respective requesting devices, and to generate source addresses for said data comprising meta-data indicative of said adjusted transmission rate caps,
 wherein the adjusted transmission rate cap imposed on each access link in said communications network enables a measurable quality-of-experience parameter for delivery of said requested data to be data to be of equivalent transmission quality on each said access link.

The source address generated by the above service platform may comprise a URL from which requested data can be retrieved by the requesting device, and wherein said meta-data comprises a pre-fix to the URL for the requested data which indicates a cap on the bandwidth over the access line which can be used when delivering the requested data to the requesting device.

Accordingly, one aspect of the invention seeks to provide a system for varying the amount of rate-capping imposed by a central content delivery platform so that this can be adjusted to take into account content requests from client terminals connected to access lines over which a QoS bandwidth boost is required.

A service platform in such a system first receives a content delivery request from a client terminal and performs a lookup to determine if a QoS bandwidth boost has been applied to the access network line connected to the content requesting client terminal. If it has, it then generates a modified source address for the data, typically in the form of a modified universal resource locator (URL), which is returned to the client terminal. The client terminal then establishes an hypertext transfer protocol (HTTP) request to the modified URL which is hosted by the content distribution platform. The URL provided indicates the level of bandwidth boost indicated for that client terminal's access line, and the content delivery platform can then take this into account when applying a rate cap to the data stream providing the content to the delivery platform so that this does not exceed a suitable level for the relevant access line.

BRIEF DESCRIPTION OF THE DRAWINGS

Preferred embodiments of the invention will now be described with reference to the accompanying drawings which are by way of example only and in which:

FIG. 46 shows how a bandwidth management scheme known in the art arbitrates between best effort and prioritised traffic for an access line with a maximum capacity of 1.6 Mbps;

DETAILED DESCRIPTION OF PRESENT EXAMPLE EMBODIMENTS

Figure 1:
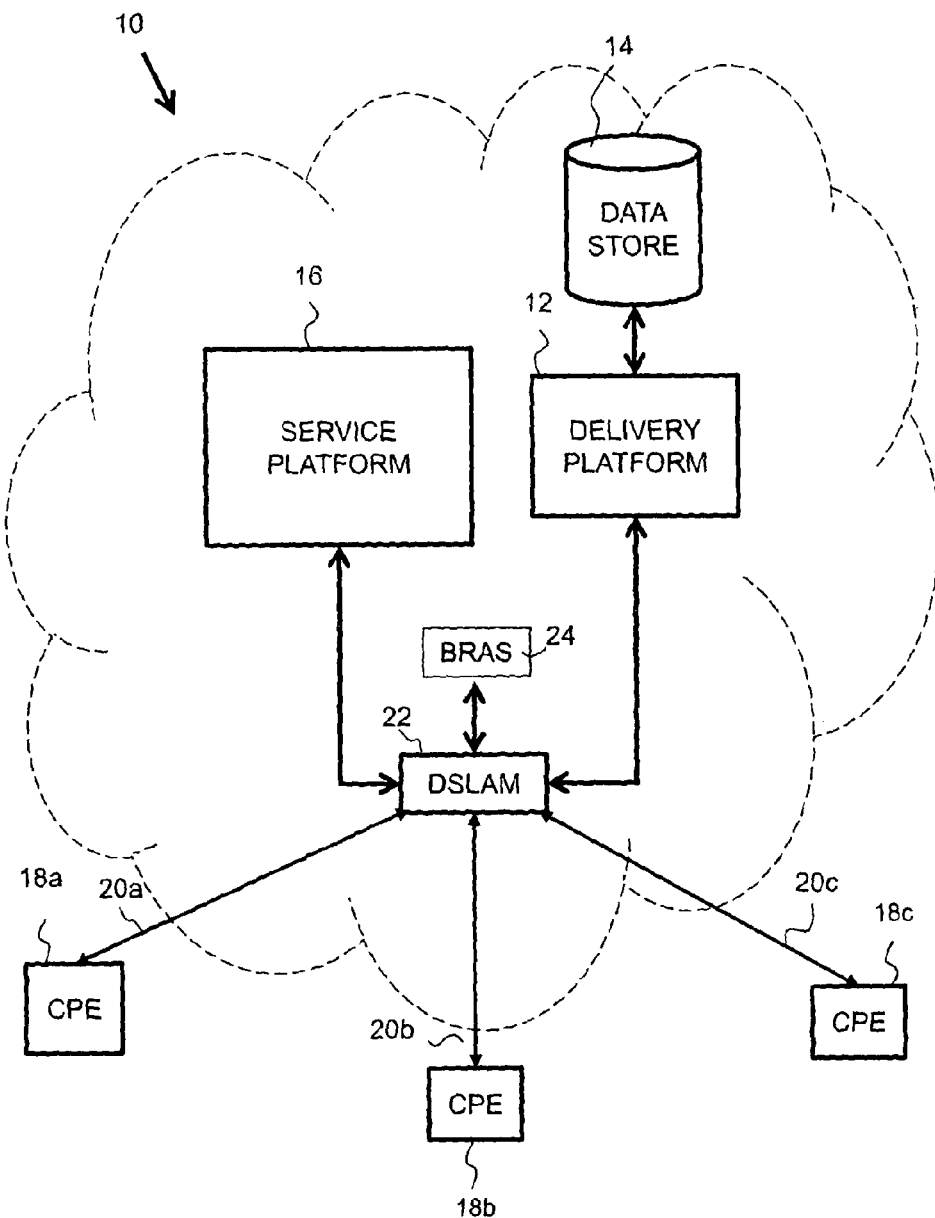
FIG. 1 shows a communications systems comprising a content distribution network.

The best mode of the invention currently contemplated by the inventor will now be described with reference to the accompanying drawings, in which like numbers are used in the numbering scheme to identify like elements.

A content distribution system will now be described in which an embodiment of the invention is implemented to manage how the delivery service uses bandwidth over access links 20 in a communications access network connecting customer premises equipment (CPE) 18 to a DSLAM 22. The invention provides a method of adjusting the transmission rate cap, the maximum bandwidth prioritised traffic can utilise at any given time for an individual traffic stream, dependent on the access link being used to stream the traffic to the customer premises equipment which will use the data being streamed.

The invention seeks to enable bandwidth to be managed during streamed data transmissions so that independent of the relevant data requested each customer will experience the same quality of service. This is provided by a service platform determining what adjustment should be imposed by the delivery platform to the transmission rate cap which will be imposed when streaming data providing a particular media asset to customer premises equipment when it receives a request for that a particular media asset for delivery to that particular customer premises equipment.

The term "media asset" is used herein to refer to a data item such as a file or data stream which comprises encoded data representing information also referred to herein as "content". Examples of content are well known in the art and references to media assets are equivalent to references to textual, image, audio and video data such as games, music, and films or television programmes etc. etc., but unless the content otherwise dictates, references to content and/or media assets refer to data capable of being streamed to customer premises. A streamed data file may be played back on the receiving device even though not all data forming the file has been transmitted to the receiving device.

The embodiments of the invention limit the transmission rate of a streamed media asset over each access line according to the respective access lines transmission characteristics. The transmission rate is preferably capped at the minimum rate required to support the encoding rate used for the particular media asset being transmitted. By restricting the level to which an individual stream is able to consume bandwidth, the utilisation of available priority bandwidth on an individual access line is capped to a value which aims to improve efficient usage of the access line between prioritised and best efforts traffic. The level set should be sufficiently high to enable data to be streamed at a high enough rate to enable the receiver buffer to fill at an appropriate rate, and, whilst data stored in the buffer is played, to ensure that the buffer does not empty. Against this, the cap must not be so high that bandwidth which could be made available for best efforts traffic without impacting the quality of service perceived by a user for the received traffic stream is not. In other words, if the cap is too high, then best efforts traffic has access to less bandwidth during the time in which prioritised data is being streamed over an access line that could have been have been available if the transmission rate used by the prioritised data stream had been capped slightly lower.

The term "encoding rate" refers herein to the rate at which a media asset is encoded and decoded for playback (also referred to herein by the term "playback rate"). The encoding rate thus indicates the rate at which a receiver buffer will decode an encoded media asset stored on a customer premises device for playback. For constant bit-rate (CBR) encoded content, the encoding rate is constant for the entire duration of the asset. This is to be contrasted with the transmission rate, which is the rate at which data is transmitted from the delivery platform to the customer premises equipment. The transmission rate over each access line 20*a* between the DSLAM 22 and the customer premises equipment may be CBR but could be VBR (variable bit rate) along each line as conditions dictate. It is known for some CDNs to adjust the encoding rate used for a data stream dynamically in response to end-to-end conditions on the transmission path to accommodate changes in the actual transmission bit rate received by a playback device to provide more continuity at the playback device, albeit with a change in the quality of the content (which is related to the encoding rate).

Accordingly, the term "transmission rate" refers herein to the rate at which a media asset is transmitted over the access network to a receiver buffer in a receiving playback client, and refers more specifically to the transmission rate over the access line to the receiver buffer. If a constant transmission rate is used with CBR encoded media, the CBR transmission rate must be equal to or greater than the CBR encoding rate to avoid the receiver buffer emptying (also referred to as buffer under-run). In practice a transmission rate is often set as mentioned above approximately 120% of an encoding rate to compensate for errors and losses in the access lines. This allows the receiver buffer to fill so that it is several seconds ahead of the current playback point, and provides room for re-transmission of lost packets.

The term "Content Distribution Network (CDN)" as used herein refers to a plurality of media servers which are networked together and connected to an access network. A local media server is usually selected by a request router to provide content to a content requesting device to enable a more efficient delivery of the requested media to the requesting device with less impact on other users of the access network.

FIG. 1 previously described hereinabovewill now be described in more detail. FIG. 1 shows a communications system 10 comprising at least one content delivery platform 12 arranged to access data items (also referred to herein as media asset files) from a data store 14 and a service platform 16 which services customer premises equipment content requests by providing a suitable address for a request router (not shown) which will forward content requests to a suitable content source. Typically, the content delivery platform 12 is provided as a distributed content delivery system or network (CDN) comprising a plurality of servers suitably networked together. Usually a large number of Customer Premises Equipment (CPE) 18a,b,c will be able establish access to their respective local server of the content delivery platform 12 by using the request router (not shown in FIG. 1) to forward requests to their respective local content server. The access network 20 comprises individual access links 20a,b,c to each CPE 18a,b,c, as shown in FIG. 1. Each access link usually comprises a copper or optical fibre line which provides the physical layer connection between a respective customer's premises and a local exchange or intermediate distribution point. Broadband services over the access network 20 are accessed by CPE 18a,b,c via a digital subscriber line access manager DSLAM (22) and are authorised once suitable credentials have been presented for broadband access approval to a broadband remote access manager (BRAS) server 24.

CPE 18 may comprise a single communications enabled device, however, it is quite usual at present for a plurality of such devices to be located at a customer's premises including residential premises. Equally, a single device may be running multiple applications simultaneously, such as a web-browser and a media player. Currently known media players such as the BBC i-player™ or Windows™ Media Player and other VoD playing applications are configured to request media assets from content providers using addresses such as universal resource locators which identify a respective server in the content delivery network. In the system shown in FIG. 1, a respective server is configured to respond to requests for streamed media assets by providing the requested data as a prioritised traffic stream. This enables media assets to be delivered in a way which should support a minimum quality of service to users of the content delivery service albeit with the limitations described herein above in prior art delivery systems unless an embodiment of the present invention is also implemented.

Figure 2:
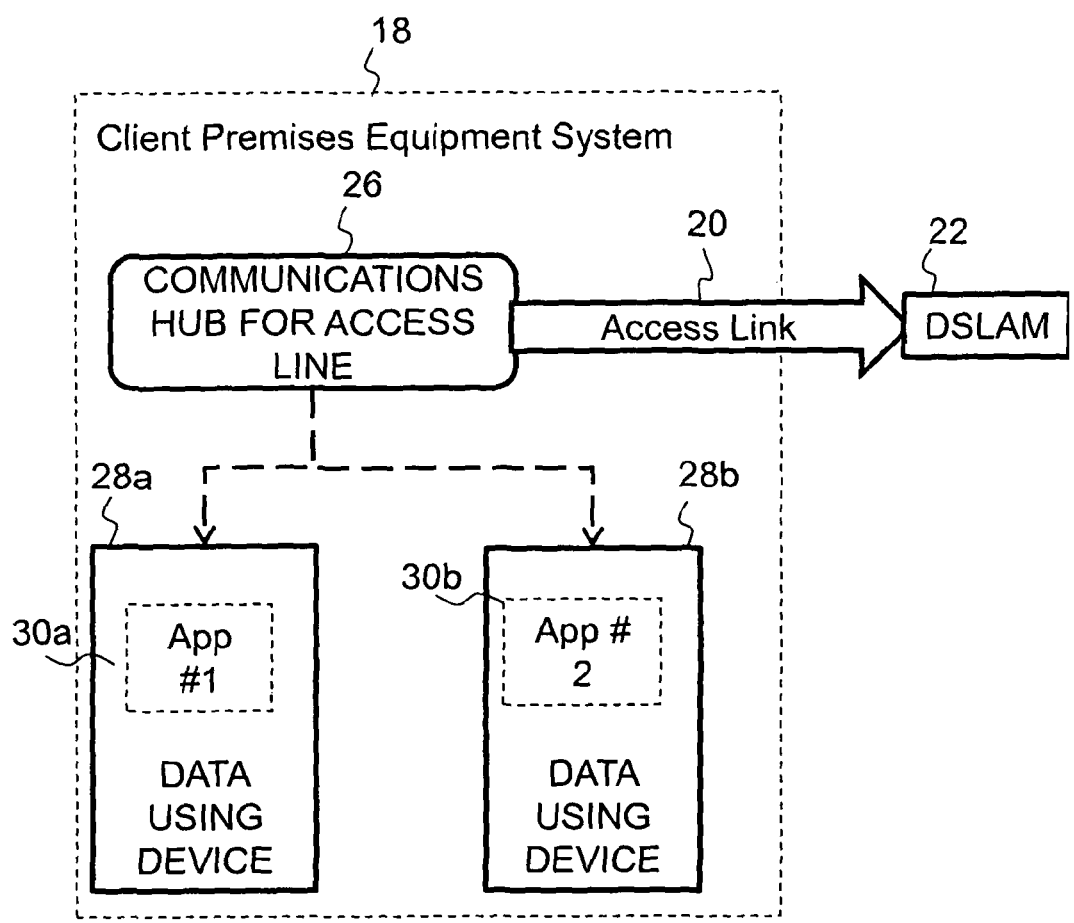
FIG. 2 shows how devices can generate traffic which competes for bandwidth over an access link.
Figure 3A:
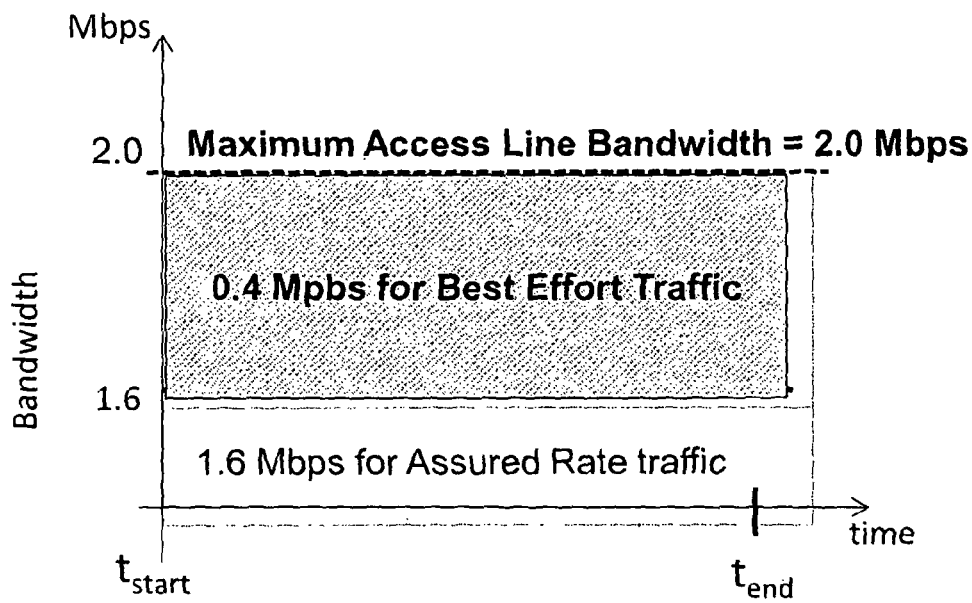
FIG. 3A shows how a bandwidth management scheme known in the art arbitrates between best effort and assured rate traffic.
Figure 3B:
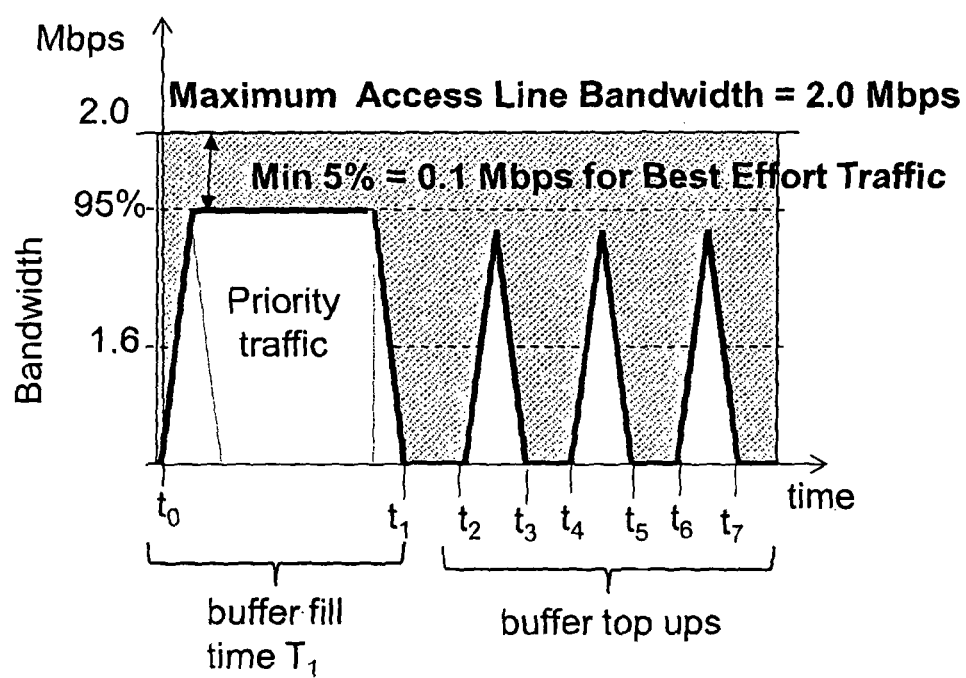
FIG. 3B shows how a bandwidth management scheme known in the art arbitrates between best effort and prioritised traffic for an access line with a maximum capacity of 2 Mbps.

FIG. 2 shows an exemplary CPE 18 arrangement comprising two communications enabled devices 28a,b which use data transmitted over the access link (they may also generate data over the link). As shown in FIG. 2, each device 28 is capable of supporting one or more applications which generate traffic over access link 20 to local DSLAM 22.

Typical examples of devices which generate traffic for the purposes of the invention comprise any digital communications enabled equipment located at the customer's premises (i.e. at the premises where the access line terminates) including but not limited to: personal computers (e.g. desktops/laptops/tablets etc.), mobile telephones and other types of mobile communications devices including handsets, headsets, and similar devices, digital communications enabled digital televisions and digital television decoders (also known in the art also as set-top boxes) which receive television and other broadcast or multicast digital content as well as specifically requested digital content such as Video On Demand "VoD", other types of communications-enabled devices such as electronic games consoles and domestic appliances (e.g. refrigerators, washing machines, cookers, etc both with and without individual displays), and, for example, 3-D printers and fabricators which are already known in the art to use data to reproduce objects using a data signal and locally sourced materials.

A customer's premises access point 26 shown in FIG. 2 provides applications 30a,b running on the data-using devices 28a,b with connectivity over broadband access link 20b. As shown, the two applications 30a,b, are hosted by different communications-devices 28a,b, but similar bandwidth conflicts over the access lien 20 will occur if they are hosted on the same device 28, if one application 30a results in prioritised traffic using access link 20b whilst the other application 30b requires best efforts traffic to use the same access link 20b.

For example consider an exemplary scenario where application 30b comprises web-browser (such as for example, Mozilla™) which requests content from remote web data resource server using an hyper-text transfer protocol (http) or similar type of protocol and data is delivered using a best-efforts delivery service. In this scenario, application 30a comprises a video player such as, for example, Windows Media Player™, for which content requests are provided by servers which generate a prioritised traffic stream over the access link. Depending on the maximum capacity of the access line 20b, if insufficient bandwidth is available for data to be delivered on a best efforts basis to application 30b, application 30b may fail to operate properly whilst application 30a is receiving its prioritised data. Accordingly, it is desirable if bandwidth is managed appropriately over the access network to ensure the maximum amount of bandwidth is made available for best effort traffic on a per line basis whilst ensuring a minimum and consistent quality of experience for viewers of media assets delivered as prioritised traffic streams.

Figure 4A:
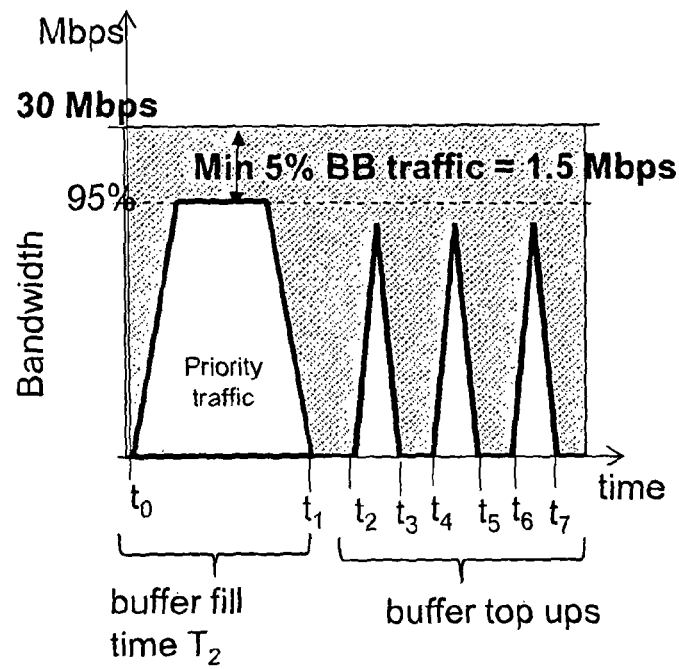
FIG. 4A shows how a bandwidth management scheme known in the art arbitrates between best effort and prioritised traffic for an access line with a maximum capacity of 30 Mbps.
Figure 4B:
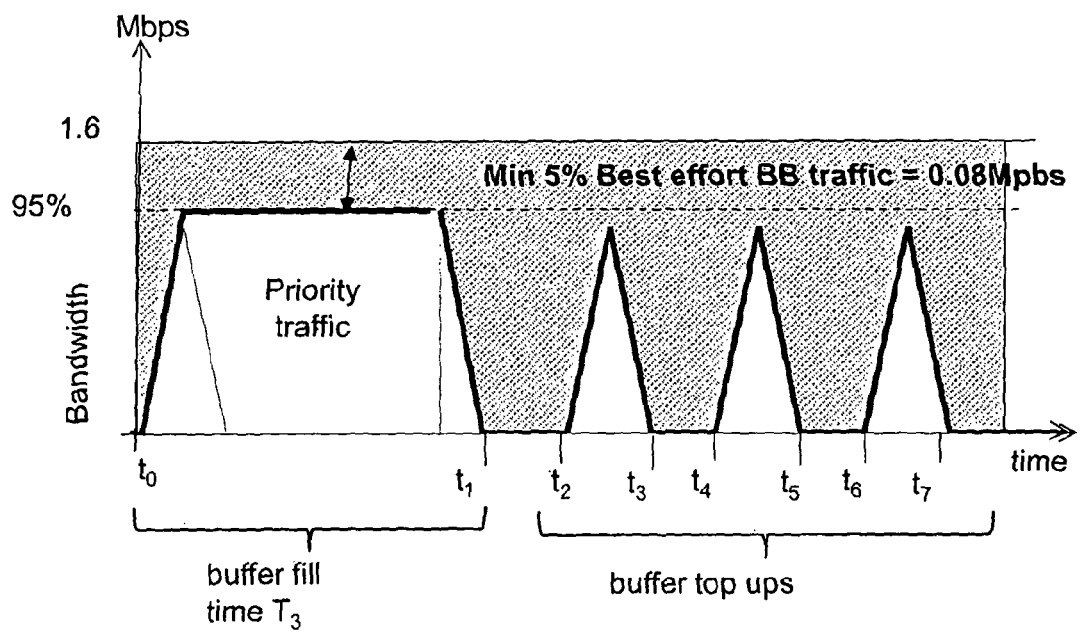

Thus for example, if application 30b requires data to be delivered on a best efforts basis at a line rate of least 0.1 Mbps over an access line 20a, then if the applications 30a,b are running on equipment connected to access line 20a which has a maximum capacity of 2 Mbps, then both will continue to perform as expected whilst application 30a is receiving prioritised data. However, if connected to an access line 20b which has a very high maximum transmission capacity, say 30 Mbps such as FIG. 4A shows, then a generic line rate cap of 95% for the transmission of prioritised traffic would enable application 30a to consume up to 28.5 Mbps over the access line 20b. This may be needlessly high for supporting a predetermined level of quality of experience during viewing of the media asset during delivery, and may impact the performance of other application(s) 30b generating best efforts traffic over the access line 20b (either directly or indirectly as remote data sources respond to these other applications). Similarly, if an access line 20c has a lower maximum transmission rate, of say 1.6 Mbps (such as FIG. 4B shows) then best efforts traffic at worse might have only to 0.08 Mbps available if prioritised traffic is able to use up to 95%. The best mode of the present invention seeks to provide a method of managing bandwidth used in the access network to arbitrate more efficiently between best efforts and prioritised traffic streams by imposing an appropriate maximum transmission rate when streaming a requested media asset over an access line 20a,b,c to customer premises equipment 18a,b,c, for example, a cap which reflects the characteristics of an individual access line 20a connected to the CPE 18a which plays the media asset during its streamed delivery.

A distribution network which provides the media asset (or streamed content) requested by application 30b is configured according to the invention to impose a cap on the amount of available bandwidth which prioritised traffic can utilise during its streamed delivery to content requesting device 28b. However, the content delivery platform is not able to assess the line error rates historically associated with each access line in an access network or other types of transmission characteristics. Accordingly, the maximum transmission rate to be used is determined by the service platform 16 from a line database 38. The service platform 16 then directs the content requesting device 28 to an appropriate location at which the requested media asset can be obtained, with the location itself being associated with the transmission rate the service platform has determined as suitable for that access line 20 in one embodiment of the invention. The content delivery platform 12 then transmits the requested media asset at the maximum transmission rate for the access network line 20 being used by the respective content requesting device 28.

The best mode of the invention expresses rate caps and adjustments in absolute rather than percentile terms. For example, a given CBR media asset encoded at 1.3 Mbps and with a conventional transmission rate cap of 1.6 Mbps over the access line may be provided with maximum transmission rate adjustments are provided to modify the transmission rate over the access line to 1.7, 1.8, 1.9, and 2.0 Mbps by the service platform 16. The rate set is as such irrespective of the maximum transmission rate over the access line 20a, for example, this could be is 2 Mbps or 30 Mbps, as it is the transmission rate of each individual traffic stream which is adjusted to enable the bandwidth over the access line 20a to be managed appropriately.

Figure 5A:
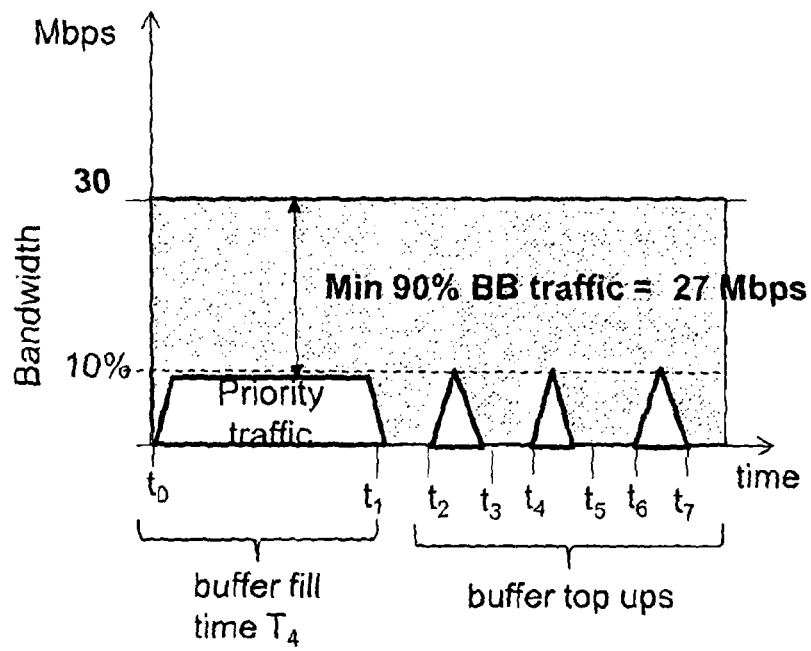
FIGS. 5A and 5B show how a generic maximum transmission rate impacts bandwidth over different access lines when streaming a media asset over two different respective access lines.
Figure 5B:
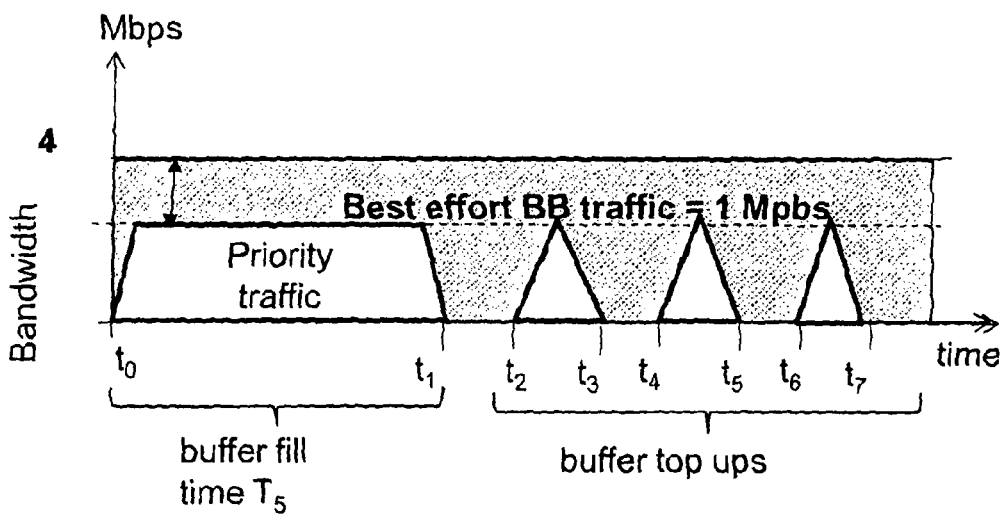

FIG. 5a shows a generic maximum transmission rate cap imposed on an access links 20 and 20b can result in a different quality of service experienced at the customer premises for the same media asset encoding rate. In FIG. 5a, access line 20b has a maximum line rate of 30 Mbps and a transmission rate cap is imposed when streaming data over each access line which uses a default value appropriate to the characteristics of the encoded content. In this case, a maximum transmission rate for an encoding rate of 2.5 Mbps is set at 3 Mbps frees 27 Mbps for best efforts traffic on this access line. However, FIG. 5B shows another access line which has a lower maximum bandwidth capacity, here 4 Mbps. If the same, maximum transmission rate of 3 Mbps is imposed, this leaves just 1 Mbps for best efforts traffic during transmission of the prioritised traffic stream with this level of cap imposed.

Figure 5C:
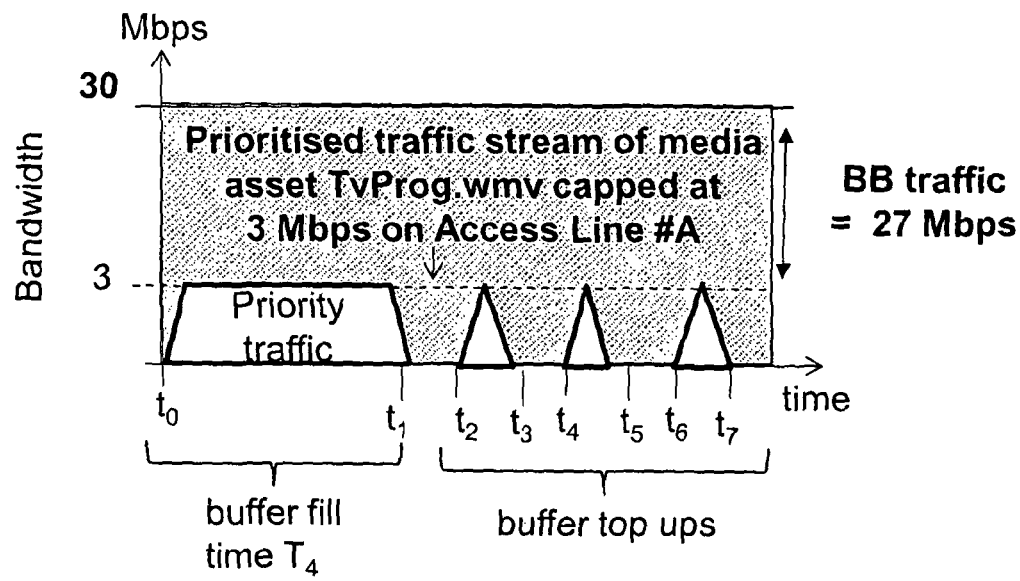
FIGS. 5C and 5D show schematically how different access lines may support different maximum bandwidths and how the available bandwidth is managed according to an embodiment of the invention.
Figure 5D:
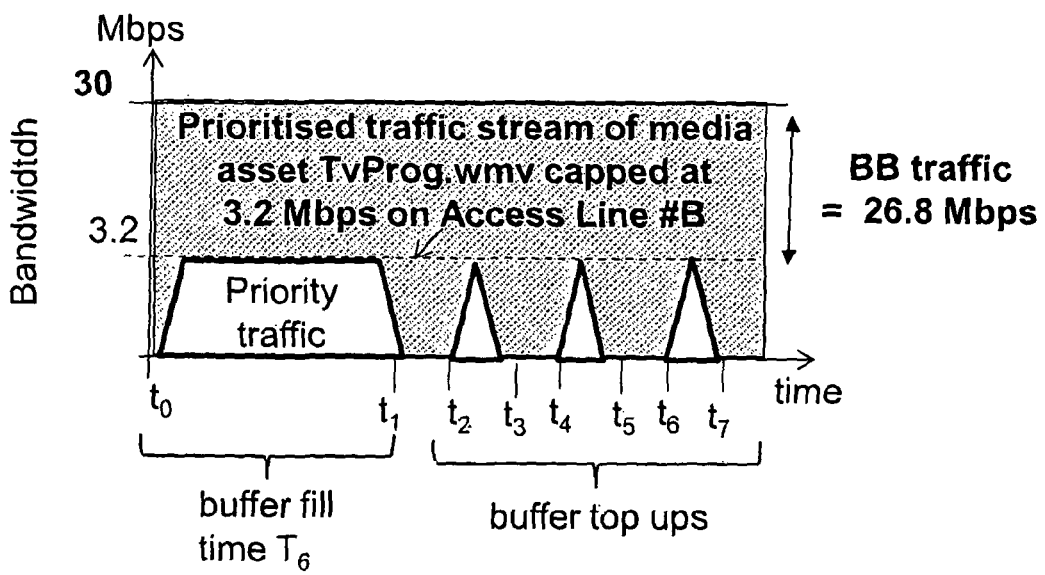

FIGS. 5C and 5D show how bandwidth is utilised on two access lines #A and #B for which a service delivery platform has determine the maximum transmission rate for a prioritised data stream (or adjusted a generic transmission rate) so as to compensate for line error characteristics of an individual access line according to the best mode of the invention currently contemplated by the inventor. In this example two 30 Mbps lines are streaming the same asset. The first one uses a generic rate cap of 3 Mbps. The second one requires an adjustment to 3.2 Mbps. In this way, a method of bandwidth management is provided which adjusts the maximum transmission rate which is imposed by the content delivery platform when streaming data for playback by a device according individual line characteristics such as the line error rate.

Accordingly, if different CPEs 18a, b are using different access lines 20a,b to receive the same streamed media asset TVProg.wmv, both access lines 20a,b may have maximum transmission capacities of 30 Mbps. However, if the line error rate on access line 20b is historically higher than that of access line 20a, the service delivery platform will determine when it retrieves the historical line error rate information from line database 38 that a higher maximum transmission rate cap should be imposed when streaming media assets over access line 20b than is used for streaming the same media assets over access line 20a. This ensures that the quality of experience of the streamed media asset when viewed on both lines is consistent, despite access line 20b having a higher line error rate. In this way, a rate cap is set which is appropriate for a given encoding rate of the requested media asset and appropriately adjusted to take line error characteristics into account.

As the Figures show, the maximum line rate and transmission rate cap imposed can impact the amount of time it takes for the receiver buffer to fill, if the same encoding rate is used in each case for the prioritised traffic. However, as long as the actual transmission rate exceeds the encoding rate by a suitable safety margin, no drop in quality of the playback experience will be perceived in the decoded signal resulting from the different line rate caps. For example, if the maximum line rate on an access line is 30 Mbps and a stream encoded at 2.5 Mbps is being transmitted, the video transmission rate cap may be set at 3 Mbps, enabling up to 27 Mbps to be available to best effort traffic without having a negative effect on the delivery of a prioritised traffic stream. Accordingly, rate caps for streaming media assets over the access lines 20a, 20b, 20c are individually adjusted according to the embodiments of the invention so that transmission no longer occurs at an arbitrary percentage of line rate for all of the access network or at an arbitrary network-wide fixed rate as is known in the art. Instead, a rate cap is set which is appropriate for a given encoding rate, adjusted to take error characteristics into account on a per access line basis.

Figure 6:
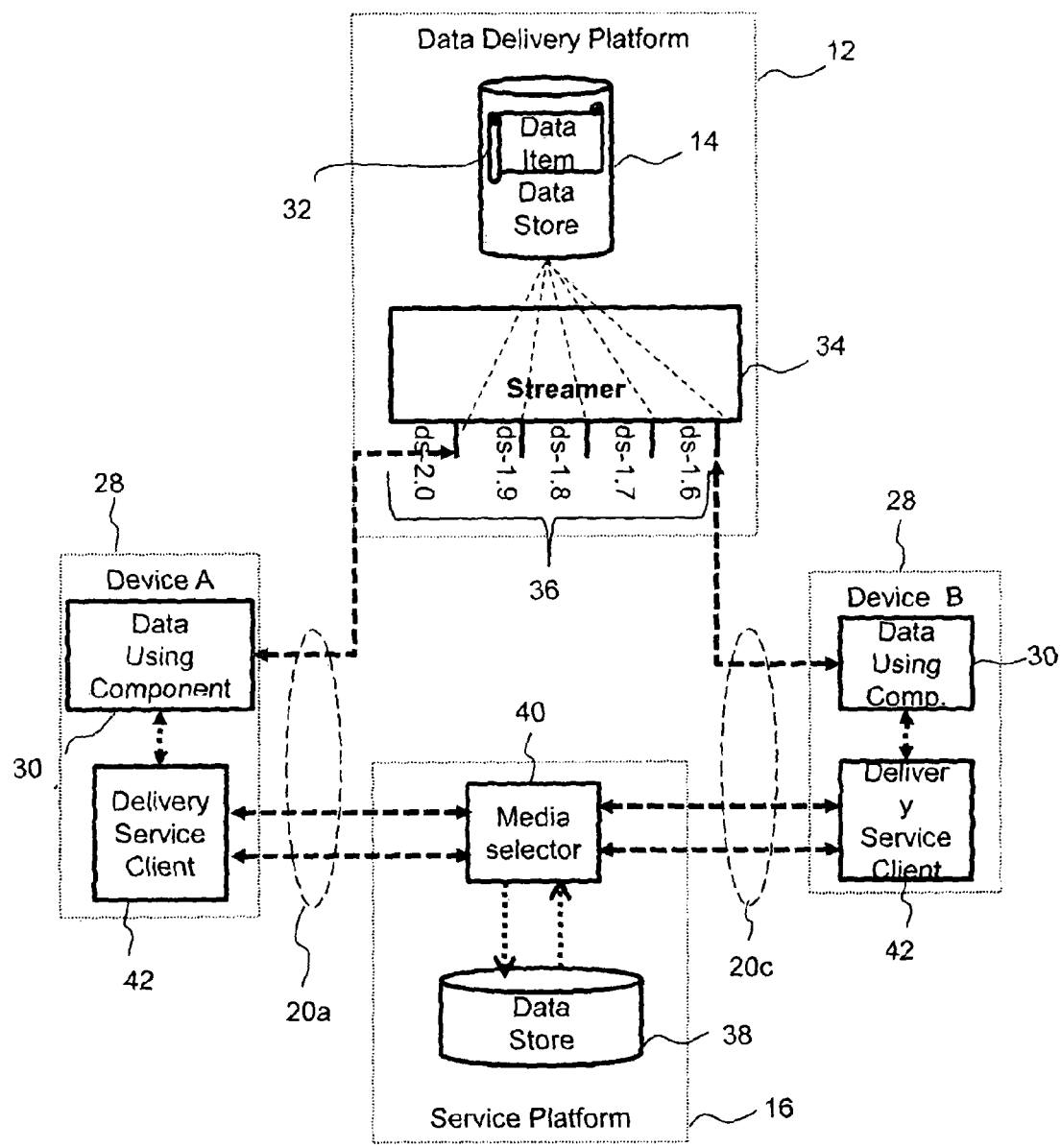
FIG. 6 shows schematically how a bandwidth management scheme according to an embodiment of the invention is implemented for content delivery services.

FIG. 6 shows in more detail system components located in the service platform 16, the delivery platform 12, and a CPE device 28 which collectively implement a method of dynamically adjusting a transmission rate for a prioritised traffic stream according to an embodiment of the invention.

As shown in FIG. 6, a data using device 28 provided on the customer premises has a data-using component such as a software application 30a (or is connected to a suitable peripheral device) which is configured to request and use specific media assets delivered by data delivery platform 12 over access link 20c, which has a maximum capacity of 1.6 Mbps. Also shown in FIG. 6 is another data using device 28 provided on different customer premises, here connected to access link 20a, which has a maximum capacity of 2.0

Mbps. This device 28 is also configured to request and use specific media assets delivered by data delivery platform 12.

Both devices 28 use respective service clients 42 which are configured to communicate service requests to a service platform 16 to enable an address for requested content to be determined. Accordingly, when devices 28 require a media asset for playback by some data using component (e.g. a video player) this is communicated to service client 42 which generates a service request for obtaining an address for the relevant media asset service requests which is sent to service platform 12. Each service request contains sufficient information for service platform 12 to identify the respective access lines 20a, 20c which a respective requesting device is connected to. Typically, a service request will identify the media asset requested, enable an appropriate encoding rate and format for the media asset to be determined, and also indicate the service identifier (ServiceID) for the broadband communications provider which has provided the communications service being used over the access network by the applications 30a running on each CPE 18a,c.

As shown in FIG. 6, when a service request is received which indicates that a particular media asset is requested, the media selector 40 performs a look-up or similar data retrieval operation based on the ServiceID associated with the request to determine from a data store 38 one or more characteristics of the access link 20a, b connecting the CPE 18a,b to the local DSLAM 22. The information retrieved from the line characteristic data store 38 indicates if the default transmission rate is to be adjusted when streaming the requested media asset data. If the default transmission rate is to be adjusted, then this is indicated in the address which is returned by the media selector 40 to the requesting device 28.

Accordingly, if both devices 28 request the same media asset (shown in FIG. 6 as a data item 32, and in FIG. 8 as TvProg.wmv) from data store 14, then the media selector will generate an address at which the media asset is to be obtained which indicates the transmission rate to be imposed when delivering the relevant data stream. The address returned by the media selector to the requesting device 28 connected to access line 20a, indicates that the media asset should be sought at an address from which the media asset will be transmitted to the requesting device with a transmission rate cap of 2 Mbps imposed, here this corresponds to a port labelled ds-2.0 on the data delivery platform 12 shown in FIG. 6. In contrast, the address returned by the media selector 40 to the requesting device 28 connected to access line 20c identifies a port 36 labelled ds-1.6 on the delivery platform 12, corresponding to a transmission rate cap of 1.6 Mbps. The ports are connected to a streamer component 34 of the delivery platform 12 which is configured to transmit data as a stream at a rate which does not exceed the transmission limit over the access line rate indicated by the relevant port on which the media asset request is received.

When a media asset is received at the streamer 34, it is processed to determine the relevant transmission criteria and any encoding limitations which may also be indicated in the request. This information enables a suitably encoded version of the media asset 32 is retrieved from data store 14 and transmitted via streamer 34 to each requesting device 18a,c via each respective access line 20a,c.

In this way, the service platform which directs requests for content to an appropriate server in a content distribution system also provides information to the requesting entity about the maximum transmission rate the content should be delivered at which is depending on the characteristics of the access network line over which the content delivery service is to be provided. This provides a method of dynamically adjusting the transmission rate to be imposed when streaming prioritised traffic to a device over the access network. The service platform media selector 40 implements this method using various suitable internal components which may be implemented in software and/or hardware as appropriate.

Figure 7:
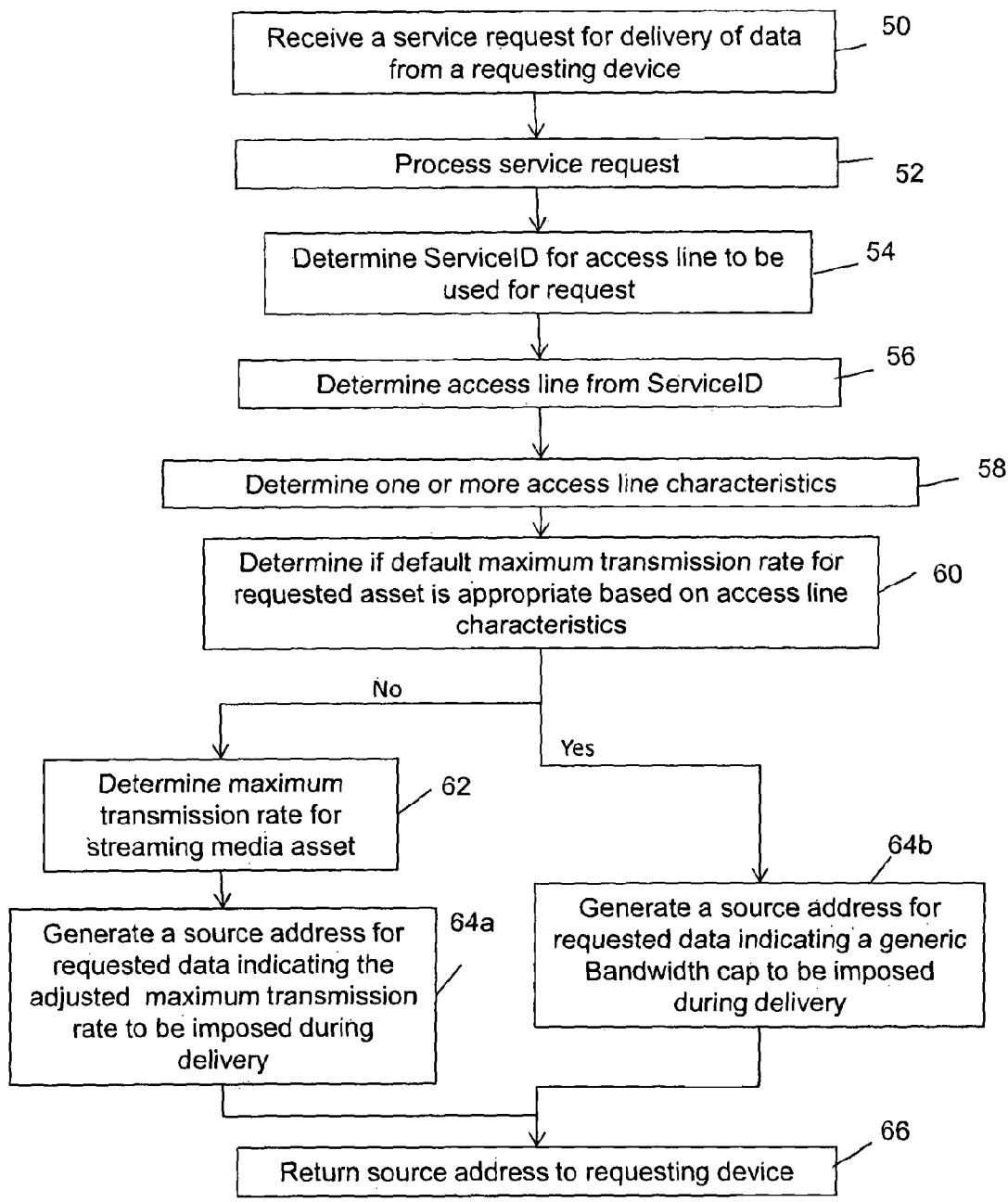
FIG. 7 shows steps performed by a service delivery platform when implementing an embodiment of the invention.

Steps performed by the service delivery platform 16 when implementing such a method of managing bandwidth over the access network are shown schematically in FIG. 7 of the accompanying drawings. A receiver is provided on the service platform 12 (not shown in FIG. 6) is arranged to receive service requests for delivery of data from requesting devices (step 50). When data such as media asset 32 is requested by from a requesting device 28 it is processed by a data processor to extract information to enable the request to be serviced by an appropriate server of the content delivery platform 12 (step 52).

The processor provided on the service platform 16 processes received service requests to extract relevant information such as an identifier for the media asset requested, as well as a service identifier (ServiceID) for the broadband communications service provider for the access line 20a,b,c, between the requesting device 18a,b,c, and the local DSLAM 22 (step 54) and any other necessary information required to fulfil the requested service. The extracted broadband communications ServiceID is used to determine which access link 20a,b,c the requesting device 18a,b,c, is connected to (step 56), for example, by querying BRAS 24 with the ServiceID.

Once an access link 20 has been identified, one or more transmission performance characteristics of the access link 20 are determined (58). The characteristics may be retrieved as historical data from a line record having that ServiceID or another suitable line identifier stored in a line performance data store 38 for the access network. The data retrieved from the data store 38 may comprise the maximum line capacity or other characteristic information for the specific access line 20a,b,c to which the connecting device 18a,b,c is associated. An example, comprises a transmission performance parameter value such as the line error rate (the rate at which errors in the data are received by the CPE 18 at various transmission speeds). The service delivery platform media selector 40 may process this information to set a maximum transmission rate for the requested media asset or, alternatively, this information may be retrieved itself from the line store. However, if the media asset dynamically determines this information when it receives a media asset request, it is able to select the maximum transmission rate is suitable for the encoding level of the content delivery service requested. In this case, depending on the maximum capacity and/or other line characteristics, a decision is made by the media selector as to whether the transmission rate cap is to be adjusted for the requested media asset delivery (step 60). If the generic transmission rate cap is suitable, then a generic address prefix is provided to the source address for the requested media asset (e.g., the universal resource locator) that the media selector generates (step 64b) and returns to the requesting device (step 66). If, however, the transmission rate cap is to be adjusted then the transmission rate cap to be imposed is determined (step 62), and a specific source address which indicates the transmission rate cap to be used when delivering the requested media asset is determined (step 64a), and this adjusted transmission rate cap source address is then provided to the requesting device 28 (step 66).

Accordingly, once the service platform has determined an appropriate transmission rate cap for prioritised traffic to be streamed along the line, this is then included as meta-data in the source address for the requested media asset, for example, as a prefix to a universal resource locator hosted by the delivery platform. In this way, a source address is generated which indicates the adjusted line rate cap to be imposed during delivery of the requested data when this is provided as said prioritised traffic over said access link to the requesting device.

Figure 8:
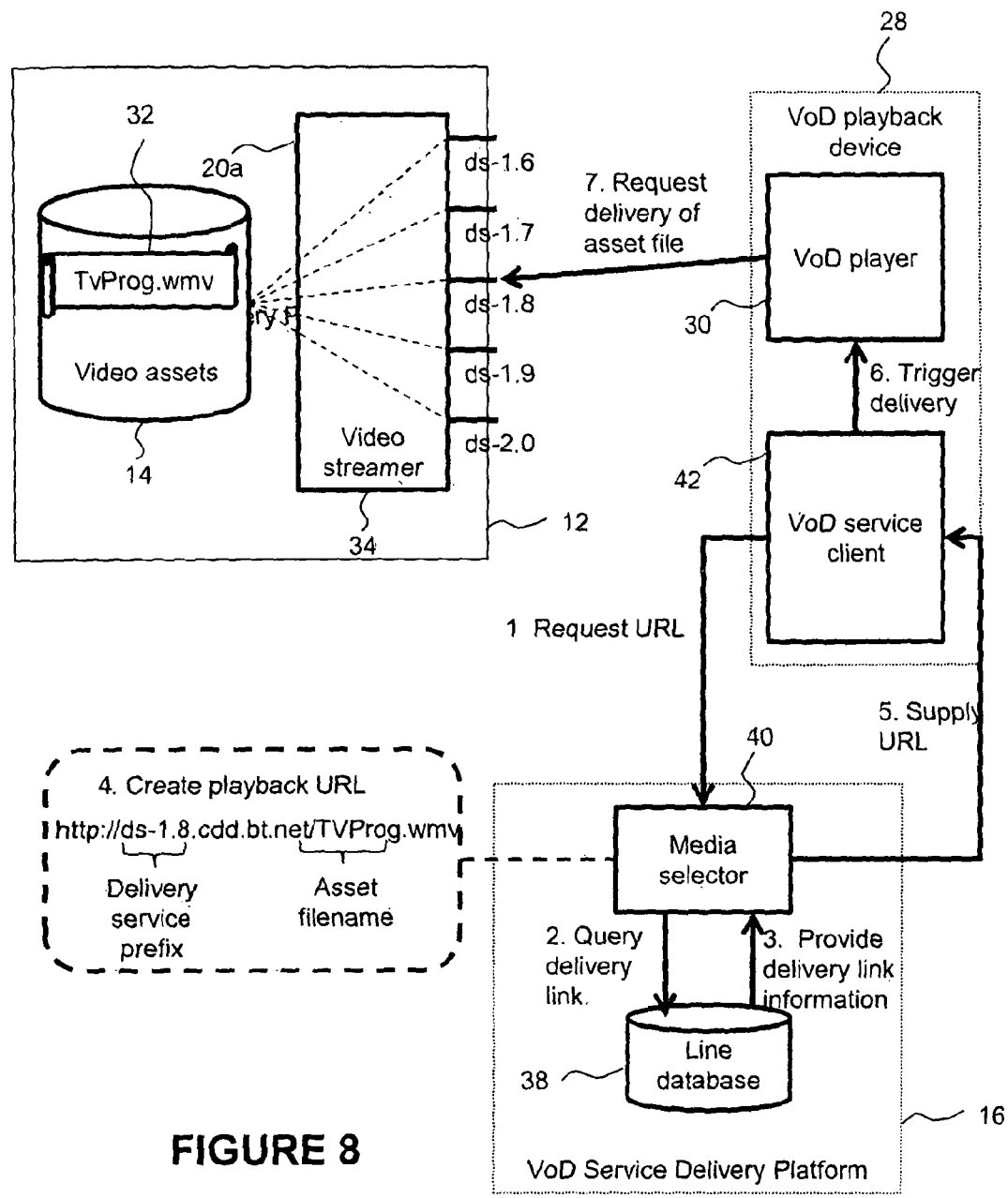
FIG. 8 shows how components of a streamed video on demand delivery system implement an embodiment of the invention.

FIG. 8 shows another embodiment of the system shown in FIG. 6 indicating some of the specific functionality performed by each component in the communications system 10 for delivery of a TvProg.wmv media asset. As shown in FIG. 8, a VideoOnDemand (VoD) playback device 28 comprises a VoD player application 30 and a VoD service client 36. The VoD service client 36 generates a URL request when the VoD player receives input from a user as to a particular media asset to be played. A service request for a suitable URL for the requested media asset is sent by the service client 36 to the service platform 16 where it is processed by the media selector 40. The media selector 40 queries the line by performing a look-up operation on line database 38 using the ServiceID provided in the service request by the requesting device which it has extracted from the received service request. The information provided by the line data base 38 enables the line characteristics to be determined and from this a transmission rate cap can be determined to be subsequently imposed by the content delivery platform 12 when servicing the request. The media selector 40 then generates a url for the requested media asset which indicates the transmission rate cap as a delivery service prefix which is pre-pended to the url at which the requested media asset file name can be obtained from. This url, for example, http://ds-1.8.cdd.bt.net/TvProg.wmv (where TVProg.wmv identifies the requested media asset file to be retrieved by the request) indicates directly which port on the delivery service platform 12 the request should be directed to, and this port then identifies that a transmission rate cap of 1.8 Mbps is to be imposed when delivering the requested media asset in this instance.

Figure 9:
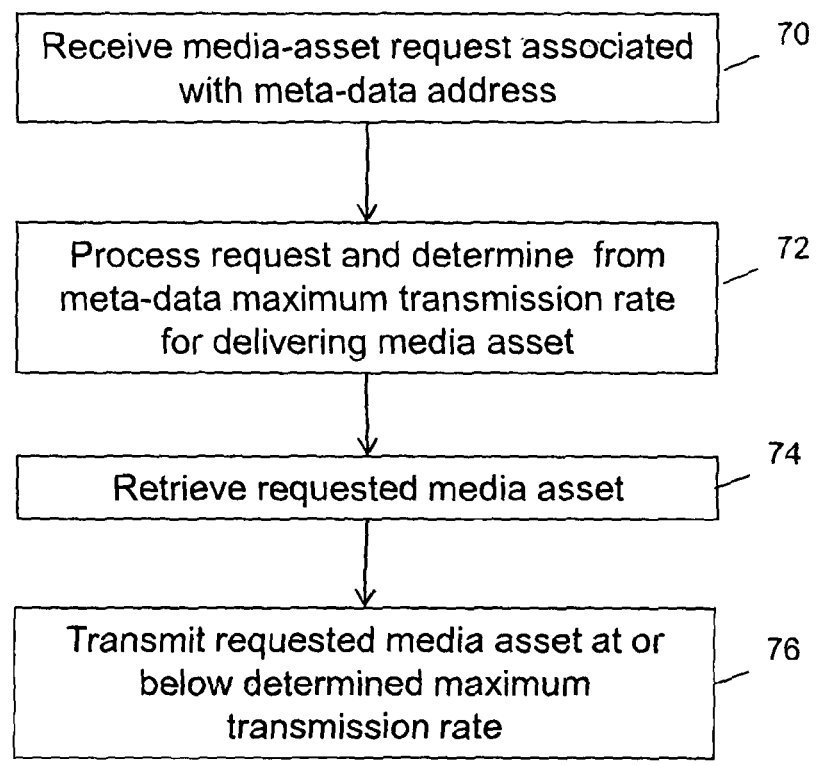
FIG. 9 shows steps performed by a delivery platform when implementing an embodiment of the invention.

After media selector 40 has returned the URL indicating the transmission rate to the media client 42 on the requesting device 28, this then triggers the data using component 30 (in FIG. 9, this is the VoD player application) to generate a delivery request for the relevant media asset which is addressed to the delivery platform 12. The url identifies the specific port on the delivery platform with which a connection is to be established for the delivery of the requested media asset, and this port has associated with it a transmission rate cap to be imposed when the requested media asset is streamed to the requesting device 28. As shown in FIG. 9, a delivery request is addressed to the port labelled ds-1.8 on video streamer 34, which means that when the request is processed and the requested TvProg.wmv is retrieved from the video asset data store 14, data forming the TvProg.wmv file is streamed at a rate no higher than 1.8 Mbps.

The embodiments of the invention thus seek to provide a delivery service which is configured to make use of specific service features, such as traffic prioritisation and rate capping in which each different delivery service is mapped to a different URL prefix. This enables a media selector 40 to select which delivery service is to be used and provide access to this service to a requesting device by providing the relevant URL for that service to the requesting device.

As shown in FIG. 9, delivery platform 12 comprises a VoD delivery platform for delivering a media asset over an access network line 18 to a video playback device 28, via one or more configurable delivery services (each associated with a different url prefix). The VoD playback device enables a user to interact with the service platform 12 and plays back media delivered using the relevant delivery service from the delivery platform 12. The delivery platform 12 is configured to enable a range of CBR media assets to be made available to requesting CPE 18 via multiple delivery services, each offering prioritisation with different rate caps ranging from a lowest rate cap that most "normal" access lines will require in order to deliver a minimum required quality of experience at the CPE to the highest rate cap, which would be suitable for lines with high error rates, and yet still enable media assets to be deliver at a required quality of experience. A typical range of delivery services will impose maximum line rates for use when streaming media assets of from 1.6 Mbps to 2 Mbps in increments of 0.1 Mbps, according to the quality of experience required and the line characteristics. The level of line rate cap is determined by the media selector 40 consulting line database 38 when constructing the URL that is passed on to the playback device 28. This determines the selection of the delivery service (and hence the transmission rate cap) to be applied for delivery of the asset to that line in the access network.

Typically, a line database comprises a historical record of the performance of each line in the access network connecting a CPE 18 to a DSLAM over time, based on, either or both of network measurements as well as customer fault reports/complaints.

In one embodiment of the invention, a media asset is selected using the requesting device 18 by a user who begins by browsing a VoD catalogue displayed on the device 18. This causes the service client 42 located on the requesting device to interact with the service platform 16 using technology such as http, html, and xml to fetch graphics, text descriptions, and meta-data associated with media assets. When a user makes a selection for VoD playback using VoD application 30, the service client located on the requesting device 28 interacts with the media selector service component 40 and supplies data that can be used to identify the required asset and format (e.g. standard definition (SD) versus high definition (HD)), as well as data that identifies the requesting access line. Based on the data supplied in the request, the media selector constructs a media URL by looking up the access line in a line database which indicates whether a higher-than-normal rate cap is required, and if so what level of adjustment should be applied. This information is used to construct the first part of the media URL. The second part of the URL determines the file path name for the specific asset and format that has been requested (see FIG. 9). The URL for the requested media asset is then returned to the requesting device 28 terminal which invokes its media player application 30 to play back media from the received URL.

According to one embodiment of the invention, line characteristics are retrieved by the service platform 16 using a standard database query against a line database that is built up over time. The database consists of an entry per access line. The entry for a given access line contains fields that specify whether any adjustment is required for rate capping, and if so what level of adjustment is required. These fields may be set by a customer service agent in response to a customer complaint/fault report (e.g. often getting jittery video experience), or may be automatically set on the basis of network monitoring.

Modification of the URL to implement an adjustment will typically involve changing a few characters in the URL, for example, if a standard URL comprises the form http://ds-1.6.cdd.bt.net/pathname, then an URL adjusted to impose a line rate cap which provides an additional 0.2 Mbps for best efforts traffic during streaming of the requested media asset comprises http://ds-1.8.cdd.bt.net/pathname.

The media selector 40 sends this URL sent back to the requesting device 28 in an HTTP response (assuming an earlier HTTP request from the requesting device 28). As mentioned above, the returned URL structure consists of a protocol selector (http://), a fully-qualified domain name that identifies the delivery service within the video delivery platform (e.g. ds-1.6.cdd.bt.net), and a pathname that identifies the media asset file to be played (e.g. /vod/tvreplay/TvProg1e1-sd.avi or as an example, /vod/tvreplay/joeys1e1-sd.avi). Thus a fully qualified domain name provided by the service delivery platform may comprise: http://ds-1.6.cdd.bt.net/vod/tvreplay/TvProg1e1-sd.avi, or as an example, http://ds-1.6.cdd.bt.net/vod/tvreplay/joeys1e1-sd.avi, where here joey is a reference to the relevant media asset programme name.

The requesting device 28 then fetches the media asset file (e.g. TvProg.wmv 32 as shown in FIGS. 6 and 8) as though it were performing an http file download, although other retrieval methods that may be supported by the content delivery platform which also result in prioritised streamed traffic may also have adjusted line rates imposed on the prioritised traffic streams in the same manner in alternative embodiments of the invention.

The above embodiments describe a CDN in which the service platform 16 responds to the requesting device, however, in alternative embodiments, it may instead relay the request for content on towards the content delivery platform 12 instead. The preferred best mode currently contemplated has an advantage in that the media URL is constructed before the user effectively is able to activate the media playback on the requesting device. In other words, in a preferred embodiment of the invention the user navigates to a page containing details of the asset they want to play, the media selector is invoked to determine the media URL, and the requesting device only at this point displays a play button that is linked to the media URL. This approach also means that the requesting device is able to interact directly with the content delivery platform for fast forwarding/rewinding/pausing etc. This approach does mean, however, that if the user does not hit the Play button subsequently, the specially constructed media URL remains unused.

The content delivery platform 12 is required to support rate capping using any suitable means known to those of ordinary skill in the art. It is necessary for transmission at a variety of rate caps to be supported, i.e., the content delivery platform must be configured to allow different rate caps for each delivery service to be imposed. No additional configuration is required in the access network to enforce this rate cap.

FIG. 9 shows key steps performed by a content delivery platform 12 when implementing an embodiment of the invention. As shown in FIG. 9, a server hosting the url provided for the content delivery platform 12 is configured so that a number of ports are provided at which media asset delivery requests are receivable. A connection to each respective port 36 enables the requested media asset to be delivered using a delivery service which has a transmission rate cap suitable for the line characteristics of the access line 20 of the requesting device 28 from which the request has been received. In this embodiment of the invention, the port is identified by meta-data provided as a pre-fix to the URL which identifies the requested media-asset. Accordingly, in one the embodiment a port 36 on the delivery platform 12 is identified in the URL used by a requesting device 28 to request a media asset. Alternatively, when the delivery platform 12 receives a media-asset delivery request (step 70) it processes the request to determine the appropriate transmission rate cap to be imposed when delivering a requested media-asset by extracting the transmission rate cap from the URL prefix. In any case, the URL identifies the maximum transmission rate to be used when streaming the requested media asset 32 to the requesting device 28 (step 72). The delivery platform 12 then retrieves a suitably encoded version of the media asset 32 from data store 14 (step 74) and then delivers the retrieved media asset to the requesting device 28 (step 76) at a transmission rate which ensuring that at no point can the media asset occupy more bandwidth on the access line than the cap for that particular access line indicated in the request URL.

In this way, a bandwidth management service is provided which provides a more consistent quality of experience for CBR encoded media assets delivered over a range of access lines. The term quality of experience refers here to the perceived quality of service experienced at the CPE 18 whilst the media asset is being played at the same time as it is being streamed. For example, for video assets, a quality of experience may comprise the picture quality perceived by a user of a video playback device 28, or the audio quality of a streamed audio file, or the responsiveness of an interactive application such as a game.

This perceived quality of a delivered media asset is dependent in part on the quality of the video encoding (i.e., the CBR encoding rate) and in part the quality of the video transmission (which is affected by the maximum bandwidth available to deliver a requested media asset) amongst other factors. Good quality transmission does not compensate for poor quality encoding (i.e. a poorly encoded video transmitted over a good quality connection will still deliver poor quality video to the end user). However, where encoding is done to a quality standard that generally enables the target mean opinion score (MOS) for user perceived quality to be achieved, drops in the perceived MOS when delivered to the customer are frequently due to poor transmission quality. The embodiments of the invention seek to provide a method of bandwidth management for delivering media assets which provides a quality of video transmission appropriate for the video asset that is being delivered which takes into account any variances in line error rate so that equivalent transmission quality is achieved on all access lines 18a,b,c to CPE 18a,b,c. This equivalent transmission quality provides consistency across the access network, by ensuring that the lowest MOS experienced by any individual user in the system is as high as possible.

As such, the adjusted transmission rate cap imposed on each access link 20 in the communications system 10 enables a measurable quality-of-experience parameter for delivery of a requested media-asset to substantially the same on each said access link 20. Measurable quality-of-experience parameters include parameters which indicate that a user of a CPE requesting device 28 has access to all content to which the user's service subscription entitles them to receive within the constraints allowed by concurrent use of multiple services on my broadband line. Accordingly, where an option to access content (whether play or download) is made available, then it should always work if the user selects it and all users should have a similar quality of experience when they receive requested content. Accordingly, QoE measures which can be used to adjust line rates include but are not limited to the following:

In this context, it is also possible to use quality of experience (QoE) parameters which indicate whether several errors have occurred within a given duration of time, typically this will be a short-time window relative to the reporting period being used. As such a QoE measure which indicates the number of service degradations within a predetermined time interval may be used in addition to a known line error rate as a means to determining a suitable maximum transmission rate for data streamed over the access line. As an example, a QoE measure of greater than one 1 "degradation of service" error within 14 days is used in one embodiment of the invention to indicate an unacceptable service quality, and the maximum transmission rate for an access line which experiences this would then be increased according to the invention to a higher transmission rate.

The table below provides other QoE metrics which can be used to determine an appropriate transmission rate cap for a particular access line:

| Line | MOS drop | Degradation of service threshold | Max tolerable event duration |
|------|----------|----------------------------------|------------------------------|
| L1 | $3.0^3$ MOS > 2.5 | 5 or more within 10 mins<br>8 or more within 20 mins | 20 s |
| L2 | $2.5^3$ MOS > 2.0 | 3 or more within 5 mins<br>4 or more within 10 mins | 15 s |
| L3 | MOS ≤ 2.0 | 1 or more within 1 min | 10 s |

The text of the abstract is repeated below as part of the description:

A service platform for a content delivery network indicates a transmission rate cap to be imposed when streaming data to a data requesting device over an access network. Means are provided for receiving a service request for delivery of data from a requesting device as the result of which the requested data is delivered as a prioritised traffic stream over an access link to the requesting device. The service platform processes the service request to determine one or more performance characteristics such as the transmission error rate and maximum bandwidth of the access link over which the requested data is to be streamed and uses this information to determine the maximum transmission rate for the requested data to be streamed at over the access link during its delivery to the requesting device. This information is included in a source address for the requested data which the service platform generates, typically as a URL. The maximum transmission rate set is provided as a prefix to the URL (or in some other meta-data format) to the requesting device, and the content delivery platform is configured to ensure that requests for media assets which are received at the logical or virtual ports associated with the URL pre-fixes are responded to by transmissions limited to the maximum bandwidth cap indicated by the URL pre-fix.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A method for adjusting a transmission rate cap imposed by a service platform on an access link in a communications network comprising a plurality of access links, the method comprising:

receiving a service request for delivery of data from a requesting device, wherein subsequent delivery of said requested data generates prioritised traffic over an access link to the requesting device using a capped transmission rate;

processing the service request to determine one or more performance characteristics of said access link;

determining from said performance characteristics of said access link whether an adjusted transmission rate cap is to be imposed on the access link during delivery of said prioritised traffic to the requesting device, and if so, generating a source address for said data comprising meta-data indicating said adjusted transmission rate cap to be imposed during delivery of said prioritised traffic over said access link to said requesting device, and reporting the source address to the requesting device;

wherein the adjusted transmission rate cap imposed on the plurality of access links in said communications network enables a measurable quality-of-experience parameter for delivery of said requested data to be of equivalent transmission quality on each said access link.

2. A method as claimed in claim 1, wherein the adjusted transmission rate cap imposed on each access link in said communications network enables a measurable contribution to a perceived mean opinion score quality parameter for delivery of said requested data to be substantially the same on each said access link.

3. A method as claimed in claim 2, wherein said perceived mean opinion score quality parameter for delivery of said requested data to be substantially the same on each said access link comprises a number of degradation in service degradations in a given time interval.

4. A method as claimed in claim 1, wherein the source address generated comprises a URL from which requested data can be retrieved by the requesting device, and wherein said meta-data comprises a pre-fix to the URL for the requested data which indicates a maximum transmission rate to be used when streaming the requested data to the requesting device over said access link.

5. A service platform for a content delivery network, the service platform including a processor for executing instructions in communication with a memory storing the instructions, the service platform being arranged to:

indicate respective transmission rate caps to be imposed when streaming data to each of a plurality of data requesting devices over respective access links to which the devices are connected;

receive service requests for delivery of data from the requesting devices; and processing each service request to determine one or more performance characteristics of said access links, to determine from said performance characteristics of said access links whether an adjusted transmission rate cap is to be imposed on each access link during delivery of prioritised traffic to the respective requesting devices, to generate source addresses for said data comprising meta-data indicative of said adjusted transmission rate caps, and to report the source address to the requesting device;

wherein the adjusted transmission rate cap imposed on each of the access links in said communications network enables a measurable quality-of-experience parameter for delivery of said requested data to be of equivalent transmission quality on each said access link.

6. A service platform as claimed in claim 5, wherein the source address generated comprises a URL from which requested data can be retrieved by the requesting device, and wherein said meta-data comprises a pre-fix to the URL for the requested data which indicates a cap on the bandwidth over the access link which can be used when delivering the requested data to the requesting device.

7. The method as claimed in claim 1, wherein the adjusted transmission rate cap imposed on each access link in said communications network enables a measurable contribution to a perceived mean opinion score quality parameter for delivery of said requested data so that a consistent quality-of-experience is provided by the delivered data over each said access link.

8. The method as claimed in claim 1, wherein the adjusted transmission rate cap imposed on each access link in said communications network enables a measurable contribution to a perceived mean opinion score quality parameter for delivery of said requested data.

9. The method as claimed in claim 8, wherein the perceived mean opinion score quality parameter comprises a number of degradation in service degradations in a given time interval.

10. The service platform as claimed in claim 5, wherein the adjusted transmission rate cap imposed on each access link in said communications network enables a measurable contribution to a perceived mean opinion score quality parameter for delivery of said requested data so that a consistent quality-of-experience is provided by the delivered data over each said access link.

11. The service platform as claimed in claim 5, wherein the adjusted transmission rate cap imposed on each access link in said communications network enables a measurable contribution to a perceived mean opinion score quality parameter for delivery of said requested data.

12. The service platform as claimed in claim 11, wherein the perceived mean opinion score quality parameter comprises a number of degradation in service degradations in a given time interval.

* * * * *